United States Patent
Xu et al.

(10) Patent No.: US 10,954,368 B2
(45) Date of Patent: Mar. 23, 2021

(54) BLOCK COPOLYMER-TOUGHENED ISOTACTIC POLYPROPYLENE

(71) Applicant: Regents of the University of Minnesota, Minneapolis, MN (US)

(72) Inventors: Jun Xu, Minneapolis, MN (US); Frank S. Bates, St. Louis Park, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 29 days.

(21) Appl. No.: 16/378,970

(22) Filed: Apr. 9, 2019

(65) Prior Publication Data

US 2019/0309149 A1 Oct. 10, 2019

Related U.S. Application Data

(60) Provisional application No. 62/655,320, filed on Apr. 10, 2018.

(51) Int. Cl.
*C08L 23/08* (2006.01)
*C08L 23/12* (2006.01)
*C08L 23/14* (2006.01)
*C08L 53/00* (2006.01)

(52) U.S. Cl.
CPC .......... *C08L 23/12* (2013.01); *C08L 23/08* (2013.01); *C08L 23/14* (2013.01); *C08L 53/00* (2013.01); *C08L 2205/02* (2013.01); *C08L 2205/035* (2013.01); *C08L 2207/10* (2013.01)

(58) Field of Classification Search
CPC .......... C08L 23/08; C08L 23/14; C08L 23/10; C08L 23/12; C08L 53/00; C08L 53/005; C08L 87/005; C08L 2205/02; C08L 2205/035; C08L 2207/02; C08L 2207/10
See application file for complete search history.

(56) References Cited

U.S. PATENT DOCUMENTS

| 8,802,774 B2 | 8/2014 | Carnahan et al. |
|---|---|---|
| 9,783,675 B2 | 10/2017 | I et al. |
| 2018/0079900 A1* | 3/2018 | Zhang .................. A61L 15/225 |

FOREIGN PATENT DOCUMENTS

| CN | 102367311 | 3/2012 |
|---|---|---|
| JP | 5270511 | 6/2010 |
| WO | WO 2003/040233 | 5/2003 |
| WO | WO 2011/119486 | 9/2011 |
| WO | WO 2017/173293 | 10/2017 |

OTHER PUBLICATIONS

Abreu and Forte, "SBS and SEBS Block Copolymers as Impact Modifiers for Polypropylene Compounds," J. App.Polym. Sci., 95(2):254-63, Nov. 2004.
Bates et al., "Isotactic polypropylene-compatible block copolymer," Journal of Polymer Science: Part B Polymer Physics, 33(9):1423-7, Jul. 1995.
Chaffin et al., "Semicrystalline Blends of Polyethylene and Isotactic Polypropylene: Improving Mechanical Performance by Enhancing the Interfacial Structure," Journal of Polymer Science Part B: Polymer Physics, 38(1):108-21, Jan. 2000.
Chen et al., "Balanced toughening and strengthening of ethylene-propylene rubber toughened isotactic polypropylene using a poly-(styrene-b-ethylene-propylene) diblock copolymer," RSC Adv., 5(27):20831-7, 2015.
Eagan et al., "Combining Polyethylene and Polypropylene: Enhanced Performance with PE/iPP Multiblock Polymers," Science, 355(6327):814-6, 2017.
Liang et al., "Rubber Toughening in Polypropylene: A Review," J. Appl. Polym. Sci., 77(2):409-17, May 2000.
Lin et al., "The Toughening Mechanism of Polypropylene/Calcium Carbonate Nanocomposites.," Polymer, 51(14):3277-84, Jun. 2010.
Liu et al., "Correlation of miscibility and mechanical properties of polypropylene/olefin block copolymers: Effect of chain composition," J. App. Polym. Sci., 125(1):666-75, Dec. 2011.
Liu et al., "Morphology and Mechanical Properties of Binary Blends of Polypropylene with Statistical and Block Ethylene-Octene Copolymers," J. Appl. Polym. Sci., 119:3591-7, Aug. 2010.
Ou et al., "Toughening and Reinforcing Polypropylene with Core-Shell Structured Fillers," J. Appl. Polym. Sci., 74(10):2397-403, 1999.
Thio et al., "Toughening of Isotactic Polypropylene with CaCO3 Particles," Polymer, 43(13):3661-74, Jun. 2002.
Uotila et al.,"Compatibilization of PP/Elastomer/Microsilica Composites with Functionalized Polyolefins: Effect on Microstructure and Mechanical Properties," Polymer, 46(19):7923-30, Sep. 2005.
Wei et al., "Toughening and Strengthening of Polypropylene Using the Rigid-Rigid Polymer Toughening Concept Part I. Morphology and Mechanical Property Investigations," Polymer, 41(8):2947-60, Apr. 2000.
Xu et al, "Block Copolymer Micelle Toughened Isotactic Polypropylene," Macromolecules, 50:6421-32, Aug. 2017.
Xu et al., "Toughened Isotactic Polypropylene: Phase Behavior and Mechanical Properties of Blends with Strategically Designed Random Copolymer Modifiers," Macromolecules, 49(17):6497-506, 2016.
Yokoyama and Ricco, "Toughening of Polypropylene by Different Elastomeric Systems," Polymer, 39(16):3675-81, Jun. 1998.

* cited by examiner

*Primary Examiner* — Irina S Zemel
*Assistant Examiner* — Jeffrey S Lenihan
(74) *Attorney, Agent, or Firm* — Fish & Richardson P.C.

(57) ABSTRACT

A blend that includes (a) a continuous phase comprising isotactic polypropylene and (b) a dispersed phase comprising a poly-(ethylene-alt-propylene)-b-poly(ethylene-ran-ethyl ethylene) diblock copolymer. The amount of diblock copolymer is less than 20 wt % based on the total weight of the blend.

11 Claims, 7 Drawing Sheets

FIG. 2a
FIG. 2b
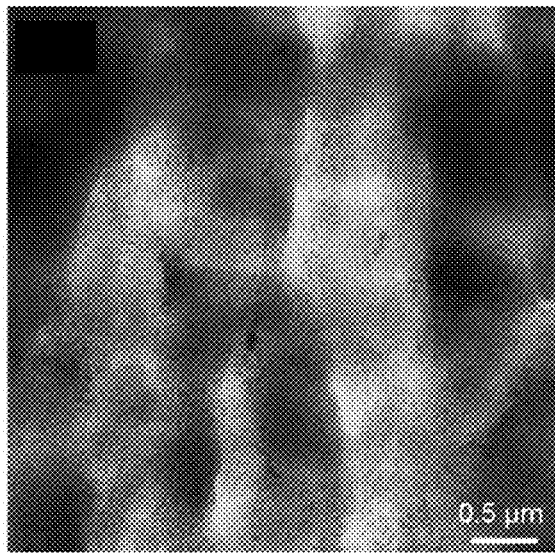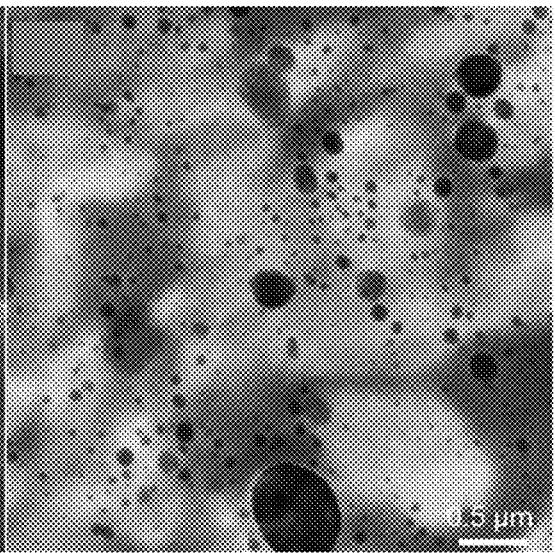

FIG. 3a
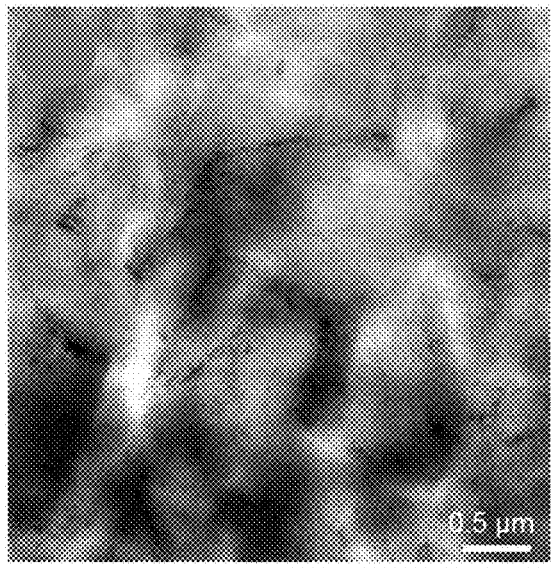
FIG. 3b
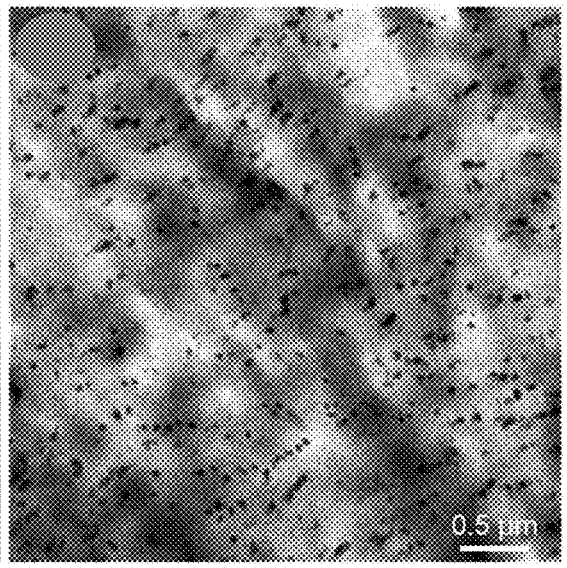
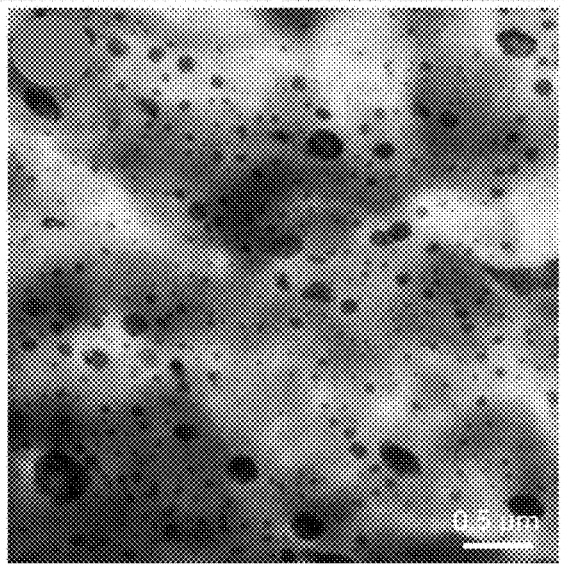
FIG. 3c

BLOCK COPOLYMER-TOUGHENED ISOTACTIC POLYPROPYLENE

CROSS-REFERENCE TO RELATED APPLICATIONS

This application claims priority to U.S. Application Ser. No. 62/655,320, filed on Apr. 10, 2018.

TECHNICAL FIELD

This invention relates to toughening isotactic polypropylene.

BACKGROUND

Isotactic polypropylene ("iPP") finds application in a wide variety of products due to its excellent processability and low cost. Examples range from packaging and textile products to components in automobiles and aircraft. However, brittleness at high strain rates and low temperatures hinders is use as a high-performance engineering plastic in some applications. To improve the toughness of iPP, efforts have been made to blend iPP with additives including rigid particles, rubbers, and hybrid core-shell structures, with rubbers being the most effective. High rubber contents on the order of 20 wt % or more are generally required to obtain adequate toughness. However, such high rubber contents reduce both the modulus and strength of the iPP material.

SUMMARY

There is described a blend that includes (a) a continuous phase comprising isotactic polypropylene and (b) a dispersed phase comprising a poly-(ethylene-alt-propylene)-b-poly(ethylene-ran-ethyl ethylene) diblock copolymer. The amount of diblock copolymer is less than 20 wt % based on the total weight of the blend. In some embodiments, the amount of diblock copolymer is less than 10 wt %, less than 5 wt %, less than 2.5 wt %, or between 1 and 5 wt % based on the total weight of the blend.

In some embodiments, the poly(ethylene-ran-ethyl ethylene) block has between 50% and 98% ethyl ethylene units, more preferably 60% to 95% or 70% to 90%. The diblock copolymer may be in the form of micelles having an average diameter no greater than 150 nm. In some embodiments, the average micelle diameter is no greater than 100 nm.

The block copolymer toughens the isotactic polypropylene at low concentrations, resulting in blends that are tough yet strong. In some embodiments, the blend has an Izod impact strength that is at least 5 times or 10 times greater than the Izod impact strength of an identical blend that lacks the block copolymer. Moreover, in some embodiments the blend has a tensile strain at break that is at least 20 times greater than the tensile strain at break of an identical blend that lacks the block copolymer.

There is also described a blend that includes (a) a continuous phase comprising isotactic polypropylene and (b) a dispersed phase comprising a poly-(ethylene-alt-propylene)-b-poly(ethylene-ran-ethyl ethylene) diblock copolymer in the form of micelles having an average diameter no greater than 150 nm. The amount of diblock copolymer in the blend is less than 10 wt % based on the total weight of the blend. The blend has an Izod impact strength that is at least 5 times greater than the Izod impact strength of an identical blend that lacks the block copolymer. In addition, the blend has a tensile strain at break that is at least 20 times greater than the tensile strain at break of an identical blend that lacks the block copolymer.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2(a) is a representative TEM micrograph of a blend containing 5 wt % PEE$_E$ in iPP.

FIG. 2(b) is a representative TEM micrograph of a blend containing 5 wt % PE in iPP.

FIG. 3(a) is a representative TEM micrograph of a blend containing 5 wt % PEP-PEE$_E$-50 in iPP.

FIG. 3(b) is a representative TEM micrograph of a blend containing 5 wt % PEP-PEE$_E$-100 in iPP.

FIG. 3(c) is a representative TEM micrograph of a blend containing 5 wt % PEP-PEE$_E$-240 in iPP.

Like reference symbols in the various drawings indicate like elements.

DETAILED DESCRIPTION

Figure 1:
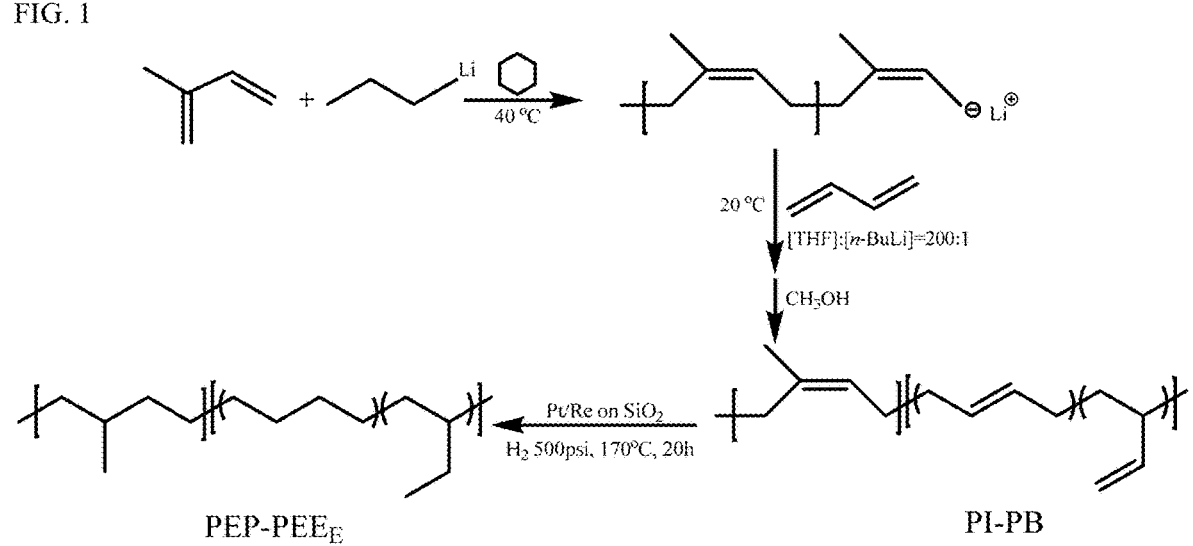
FIG. 1 is a synthetic scheme for the preparation of PEP-PEE$_E$ diblock copolymers.
Figure 4A:
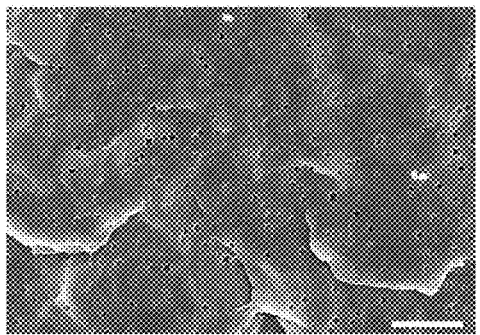
FIG. 4(a) is an SEM micrograph of a blend containing 5 wt % PEP-PEE$_E$-100 in iPP.
Figure 4C:
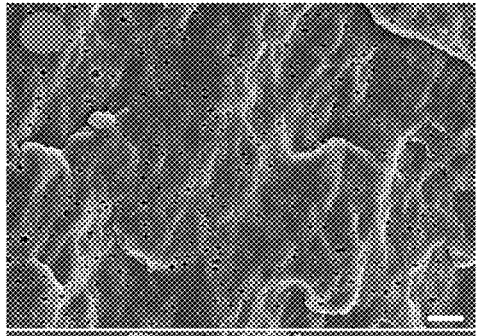
FIG. 4(c) is an SEM micrograph of a blend containing 5 wt % PEP-PEE$_E$-240 in iPP.
Figure 4E:
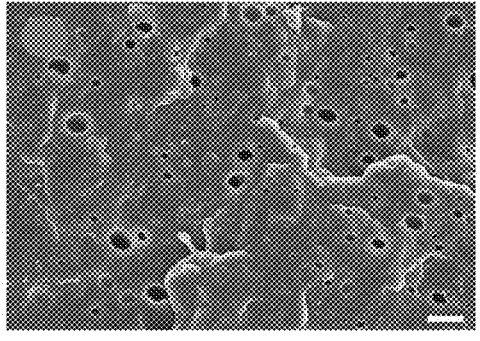
FIG. 4(e) is an SEM micrograph of a blend containing 5 wt % PEP in iPP.
Figure 4B:
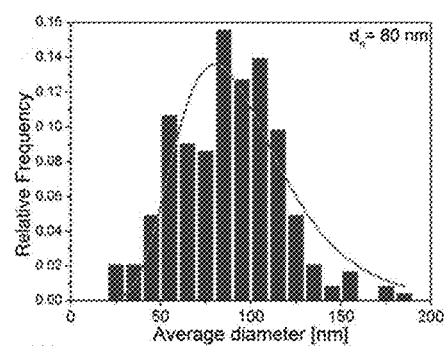
FIG. 4(b) is the corresponding particle size distribution of the blend shown in FIG. 4(a).
Figure 4D:
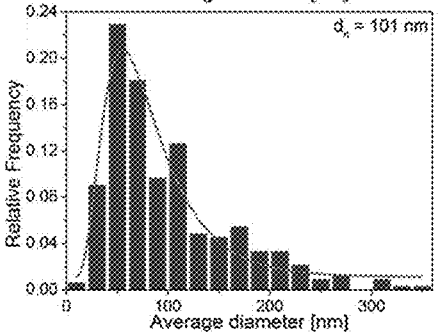
FIG. 4(d) is the corresponding particle size distribution of the blend shown in FIG. 4(c).
Figure 4F:
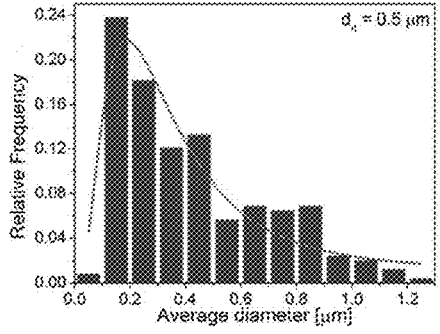
FIG. 4(f) is the corresponding particle size distribution of the blend shown in FIG. 4(e).

Poly-(ethylene-alt-propylene)-b-poly(ethylene-ran-ethyl ethylene) diblock copolymers ("PEP-PEE$_E$ diblock copolymers") may be prepared by sequential anionic polymerization of isoprene and butadiene followed by catalytic hydrogenation, as shown schematically in FIG. 1. The PEP block is an iPP-miscible block while the $PEE_E$ block is iPP-immiscible. Preferably, the $PEE_E$ block has between 50% and 98% ethyl ethylene units, more preferably 60% to 95% or 70% to 90%, to facilitate miscibility in iPP. The block copolymer may be combined with iPP using a variety of methods including melt blending with, e.g., a circulating microcompounder or twin-screw extruder. The amount of block copolymer is no more than 20 wt % based upon the total weight of the blend. Preferably, the amount of block copolymer is less than 10 wt %, less than 5 wt %, less than 2.5 wt %, or between 1 and 5 wt % based on the total weight of the blend.

Once combined, the block copolymer self-assembles into relatively uniformly sized nanoscale micelles. The micelles have an average diameter of no greater than 150 nm, preferably no greater than 100 nm. Inclusion of the block copolymer creates iPP blends having good tensile properties and significantly improved toughness relative to pure iPP at low block copolymer concentrations.

EXAMPLES

Experimental

Materials: A commercially available iPP (HD915CF) with a melt flow rate (MFR) of 8.0 g/10 min (230° C./2.16 kg) was provided by Borouge (Abu Dhabi, United Arab Emirates) and used as received. The number-average and weight-average molecular weights were 28 and 211 kg/mol, respectively, based on high temperature SEC measurements calibrated with PE standards.

Three symmetric $PEP-PEE_E$ diblock copolymers were synthesized by sequential anionic polymerization of isoprene and butadiene followed by catalytic hydrogenation as shown in FIG. 1. Cyclohexane was collected from an alumina column. Isoprene (Sigma-Aldrich, ≥99%) and butadiene (Sigma-Aldrich, ≥99%) were purified by distillation from n-butyllithium (n-BuLi) twice and transferred into clean and dry burettes. n-BuLi was injected into the solvent contained in a Schlenk reactor blanketed with purified argon, followed by the addition of isoprene, which was allowed to react for 6 h at 40° C. An aliquot of the living polymer was extracted by cannula to determine the molecular weight and dispersity, then the reactor was cooled to 20° C. and butadiene was added along with a small amount of tetrahydrofuran (THF) ([THF]:[n-BuLi]=200:1). The reaction was terminated with degassed methanol after another 18 h and the diblock copolymer was recovered by precipitation in cold methanol followed by vacuum drying and subsequent freeze drying from benzene.

The PI-PB diblock copolymers were dissolved in cyclohexane at a concentration of 10-20 g/L and hydrogenated to $PEP-PEE_E$ in a high-pressure reactor at 170° C. with 500 psi $H_2$ for 20 h using a $SiO_2$ supported Pt/Re catalyst.[41] Then the resulting solution was filtered to remove the catalyst and the polymer product was precipitated in cold methanol and dried in a vacuum oven at 100° C. overnight.

Molecular weights and dispersity ($Đ_{PI}$) of PI aliquot and dispersity of $PEP-PEE_E$ ($Đ_{total}$) were determined using room temperature size exclusion chromatography (SEC) at a concentration of 1-2 mg/mL with THF as the mobile phase and calibrated with polystyrene standards. The Mark-Houwink parameters used for the universal calibration are: $K_{1,4-PI}$=15.7×10$^{-3}$ mL/g and $α_{1,4-PI}$=0.731, and $K_{PS}$=8.63× 10$^{-3}$ mL/g and $α_{PS}$=0.736.[42] The microstructure of the PI and PB blocks were determined by integration of characteristic peaks in $^1$H NMR spectra obtained from 10% (w/w) $CDCl_3$ solutions using a Bruker HD500 spectrometer. All the PI blocks contained 94% 1,4 and 6% 3,4 repeat units based on these measurements.

Blend Preparation: Blends of iPP and $PEP-PEE_E$ diblock copolymers for tensile testing were prepared using a recirculating DSM Xplore twin screw micro-compounder of 5 mL capacity operated for 5 min at a rotation speed of 100 rpm and a temperature of 180° C. Larger batches of blends (100-150 g) for Izod impact testing were prepared with 200 ppm antioxidant BHT using a 16-mm twin-screw extruder (PRISM, L:D 24:1) operated at 180° C. and screw speed 30-35 rpm followed by water cooling, air drying and pelletizing. The pellets were fed and extruded again to eliminate potential inhomogeneity in the blends.

Thermal Analysis: Glass transition temperatures ($T_g$) of $PEP-PEE_E$ diblock copolymers, and PEP and $PEE_E$ homopolymers, were determined using differential scanning calorimetry (DSC). 5-10 mg of sample was sealed in an aluminum pan and loaded in a TA Q1000 DSC instrument, then heated to 200° C. at 10° C./min and kept at this temperature for 10 min to erase the previous thermal history, then cooled to −100° C. followed by another heating cycle back to 200° C. both at a rate of 10° C./min.

Mechanical Properties: Dumbbell shaped tensile bars (ASTM D1708, 0.6 mm thick, 5 mm gauge width, 22 mm gauge length) were compression molded at 180° C. and 3 MPa pressure for 5 min using a Carver hot press followed by water cooling to room temperature. The room temperature tensile tests were conducted using a Shimadzu AGX tensile tester operated at a crosshead speed of 5 mm/min. Izod impact specimens (ASTM D256) were molded with a Morgan Press injection molder (barrel temperature=220° C., nozzle temperature=230° C. and mold temperature=50° C.) and notched with a CEAST NotchVis notcher. Notched Izod impact strength was determined using a CEAST impact strength tester (model 6545). All specimens were aged at room temperature for 72 h prior to testing. At least 10 parallel tests were performed to obtain statistically significant tensile and impact properties.

Morphology: Transmission electron microscopy (TEM) was employed to investigate blend morphology prior to any testing and the microstructure of the tensile specimens at the yield point. Bulk specimens were cryo-sectioned at −120° C. using a Leica EM UC6 ultramicrotome (Model FC-S Cryo attachments) fitted with a trimming knife. This was done perpendicular to the gauge direction for compression molded samples, and perpendicular to the flow direction for injection molded ones; then the smooth surface was stained with a freshly prepared $RuO_4$ solution. Ultrathin sections (<100 nm) were obtained by cryo-microtoming the stained smooth surface at −120° C. with a Micro Star diamond knife and then collected on copper grids. Procedures were the same for the specimens captured at the yield point except that whitened gauge areas were used.

Samples were imaged using a Tecnai G2 Spirit Biotwin microscope with an accelerating voltage of 120 kV. Scanning Electron Microscopy (SEM) was also utilized to study the blend morphology and fracture surfaces of Izod impact specimens. Pristine tensile bars were cryo-fractured in liquid nitrogen, immersed in tetrahydrofuran for at least 24 h to extract the diblock copolymer from the iPP matrix and dried at room temperature in a vacuum oven overnight.

Fracture surfaces were imaged without any further processing after the Izod impact tests. To image the microstructures of the whitened zone under the Izod fracture surface, the specimen was cut open perpendicular to the notch with a fresh razor blade. All SEM specimens were sputter coated with a 5-nm thick platinum layer to prevent charging before being examined using a Hitachi S4700 field emission scanning electron microscope with 5 kV accelerating voltage and approximately 10 mm working distance.

Rheology: An ARES rheometer configured with 25-mm parallel plates at a gap of 1 mm was utilized to characterize the viscoelastic behavior of the PEP-PEE$_E$ diblock copolymers. Frequency sweep experiments over a range of 0.1 rad/s-100 rad/s at 30° C. were performed for PEP-PEE$_E$-50 and PEP-PEE$_E$-100. Experiments with PEP-PEE$_E$-240 were conducted from 30 to 120° C., over the frequency range 0.01 rad/s-100 rad/s and reduced to a reference temperature of 30° C. using time-temperature superposition to construct a master curve.

Results

Diblock copolymers: The three PEP-PEE$_E$ block copolymers had number average molecular weights of approximately 50 (PEP-PEE$_E$-50), 100 (PEP-PEE$_E$-100), and 240 (PEP-PEE$_E$-240). The three PEP-PEE$_E$ block copolymers exhibited a single T$_g$ (−54° C., −55° C., or −57° C., respectively) that lies between those of the two homopolymer counterparts, PEP and PEE$_E$ (−58° C. and −49° C., respectively). All three diblock copolymers were disordered at room temperature, exhibiting liquid-like terminal behavior (i.e. G'∼ω$^2$, G''∼ω) in the rheological spectra.

Blend Morphology: Representative TEM micrographs obtained from iPP/PEE$_E$ and iPP/PEP blends containing 5 wt % homopolymer additive are presented in FIGS. 1(a) and (b). The PEE$_E$ was melt-miscible with iPP as evidenced by the lack of any segregated domain structure in FIG. 2(a). On the other hand, the 5 wt % iPP/PEP blend (FIG. 2(b)) shows a macrophase separated structure as often observed in rubber toughened iPP blends containing EPR rubber with a mixture of particles sizes up to about 1 μm in diameter.

TEM images of the three iPP/PEP-PEE$_E$ blends with 5 wt % diblock copolymer concentrations are shown in FIGS. 3(a), (b), and (c). The 5 wt % iPP/PEP-PEE$_E$-50 blend (FIG. 3(a)) is essentially featureless, similar to FIG. 2(a), suggesting that PEP-PEE$_E$-50 is miscible with the iPP in the melt state. The 5 wt % iPP/PEP-PEE$_E$-100 blend (FIG. 3(b)) shows discrete micelles with an average size of approximately 80 nm in diameter while the 5 wt % iPP/PEP-PEE$_E$-240 blend (FIG. 3(c)) displays somewhat larger particles and a larger distribution of particle diameters.

SEM micrographs of the solvent extracted iPP/PEP-PEE$_E$-100, iPP/PEP-PEE$_E$-240 and iPP/PEP blends with 5 wt % concentrations are shown along with the corresponding droplet size distributions in FIGS. 4(a)-(f). These images are consistent with the TEM micrographs shown in FIGS. 2 and 3. The diameters of at least 300 droplets were calculated for each blend based on $$d = 2\sqrt{\frac{A_i}{\pi}}$$

where A$_i$ is the area of an individual droplet that is measured with ImageJ. The average droplet size for the PEP-PEE$_E$ diblock copolymers was about 5 times smaller than that obtained with PEP, demonstrating that the iPP-miscible PEE$_E$ block plays a significant role in dispersing the iPP-immiscible PEP blocks at a length scale of approximately 100 nm.

Tensile Properties: The pristine iPP material breaks at about 20% strain. The addition of PEP homopolymer increased the strain at break to 100%. Incorporation of discrete 80 to 100 nm size PEP-PEE$_E$ droplets resulted in a very tough material, raising the strain at break to 500%. Images of tensile specimens of 5 wt % iPP/PEP-PEE$_E$-100 blends at different stages during the tensile experiments (yield point (4-6%), 20%, 100% and 500% strain) revealed that the whole gauge region was whitened at the yield point, likely due to cavitation of the uniformly dispersed micelles.

Figures 5A, 5B:
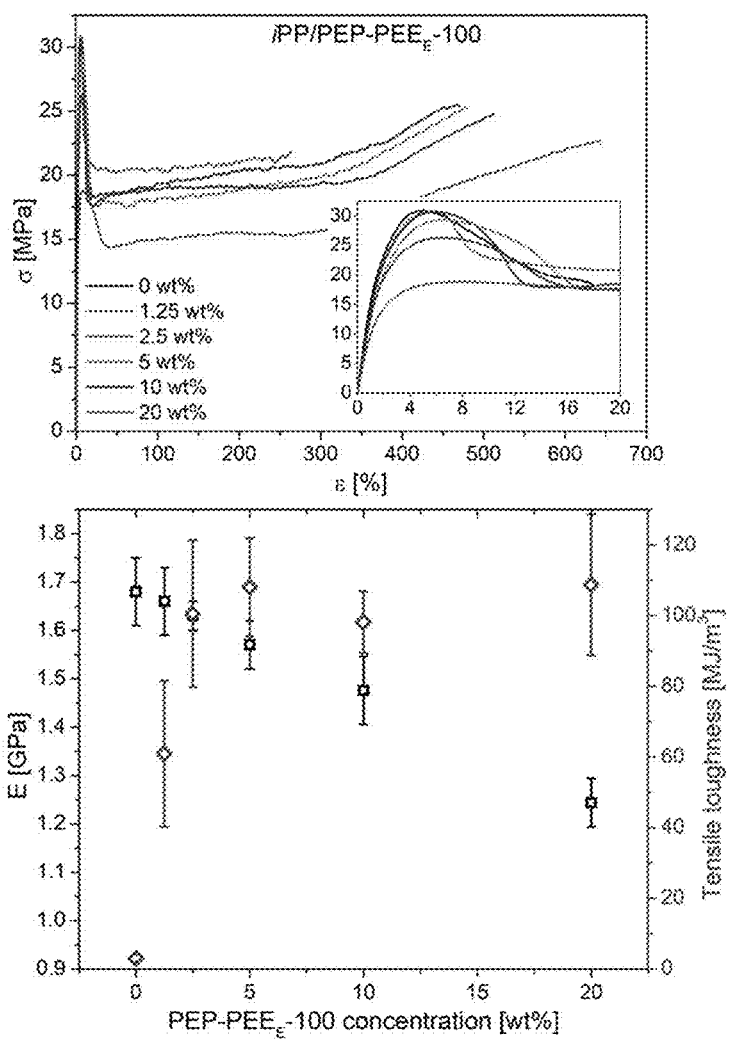
FIG. 5(a) is a graph showing the stress-strain curves of iPP/PEP-PEE$_E$-100 blends where the PEP-PEE$_E$-100 amount ranged from 1.25 wt % to 20 wt %.
FIG. 5(b) is a graph showing elastic modulus (E) and tensile toughness as a function of PEP-PEE$_E$-100 concentration for the blends shown in FIG. 5(a).

Stress-strain curves obtained as a function of concentration between 1.25 and 20 wt % PEP-PEE$_E$-100 are displayed in FIG. 5(a); at least ten independently fabricated specimens were tested for each blend composition. Two key parameters, elastic modulus and tensile toughness (area under stress-strain curve prior to failure), are plotted against the weight fraction of PEP-PEE$_E$-100 in FIG. 5(b). The results demonstrate that merely 2.5 wt % block copolymer produces optimal toughness with little deterioration in the elastic modulus.

Figure 6A:
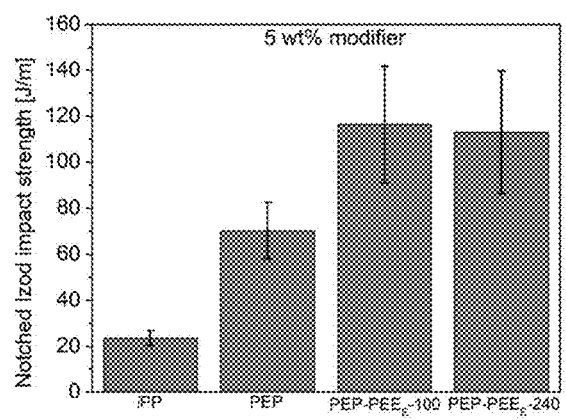
FIG. 6(a) is a graph showing the Notched Izod impact strength of iPP, PEP, iPP/PEP-PEE$_E$-100 (5 wt %), and iPP/PEP-PEE$_E$-240 (5 wt %).

Notched Izod Impact Strength: The effects of PEP-PEE$_E$ diblock copolymers and PEP homopolymer on the room-temperature impact strength of iPP are illustrated in FIGS. 6(a) and (b). Pure iPP is brittle with an Izod impact strength of 24 J/m. The addition of 5 wt % and 10 wt % PEP led to a modest and nearly invariant improvement in impact toughness. Adding 5 wt % of PEP-PEE$_E$-100 or PEP-PEE$_E$-240, however, increased the impact strength by a factor of 5, and 10 wt % of the higher molecular weight diblock results in a 12-fold enhancement in the Izod impact strength.

Figure 6B:
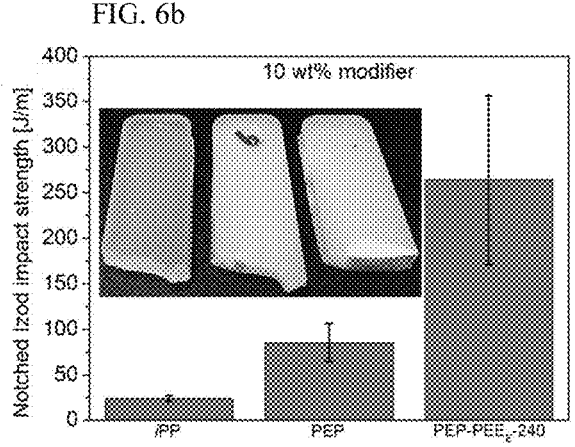
FIG. 6(b) is a graph showing the Notched Izod impact strength of iPP, PEP, and iPP/PEP-PEE$_E$-240 (10 wt %). The inset in FIG. 6(b) shows the side view of the specimens after fracture).

The inset in FIG. 6(b) presents the images of specimens after testing, offering qualitative evidence of the failure modes. Pure iPP fails by brittle fracture with no stress whitening. The 10 wt % iPP/PEP blend produced a little stress whitening near the tip of the notch. 'Shear lips' were observed in both specimens, indicating a stress state that is close to plane stress near the free surface. Adding 10 wt % iPP/PEP-PEE$_E$-240, on the other hand, led to extensive stress whitening in the entire area of failure and beneath the fracture surface, indicating a large plastic zone and a tough fracture mode.

Figure 7A:
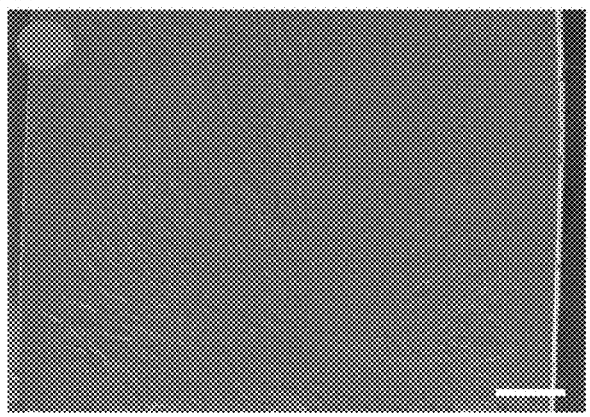
FIG. 7(a) is an SEM micrograph of the fracture surface of iPP.
Figure 7B:
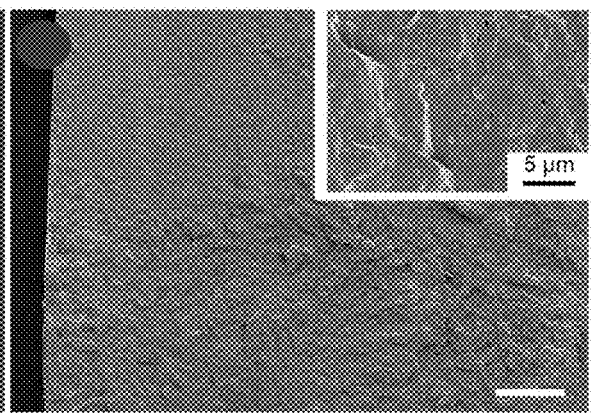
FIG. 7(b) is an SEM micrograph of the fracture surface of a blend containing 10 wt % PEP in iPP after Izod impact testing. The inset shows a microscopic view of the surface.
Figure 7C:
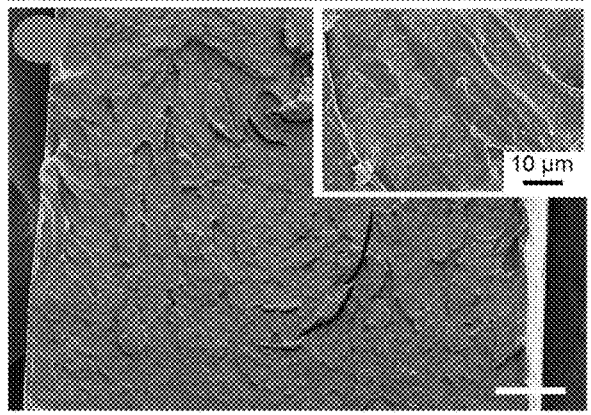
FIG. 7(c) is an SEM micrograph of the fracture surface of a blend containing 10 wt % PEP-PEE$_E$-240 in iPP after Izod impact testing. The inset shows a microscopic view of the surface.
Figure 7D:
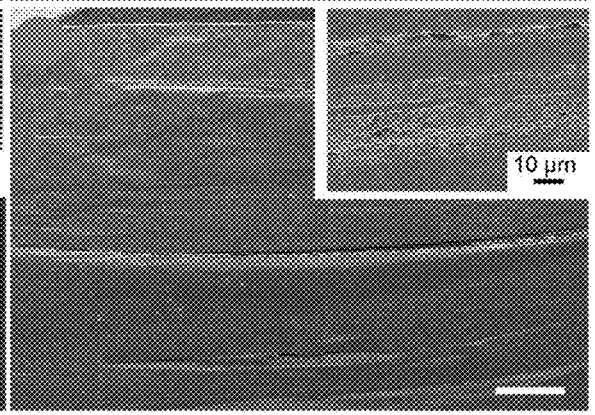
FIG. 7(d) is an SEM micrograph showing the whitened zone underneath the fracture surface of the blend shown in FIG. 7(c). The inset shows a microscopic view of the surface.

Fractography: SEM micrographs comparing the fracture surfaces of pure iPP, 10 wt % iPP/PEP and 10 wt % iPP/PEP-PEE$_E$-240 blend are presented in FIGS. 7(a)-(d), demonstrating different fracture behaviors during the Izod impact testing. The fracture surface of pure iPP (FIG. 7(a)) is smooth with almost no distinguishable small features associated with energy absorption. The surface of the failed 10 wt % iPP/PEP blend (FIG. 7(b)) is rougher. The higher-magnification image in the inset of FIG. 7(b) reveals voids that are spherical in shape, indicating particle pull-out likely due to poor adhesion between PEP and the iPP matrix. The fracture surface of the 10 wt % iPP/PEP-PEE$_E$-240 specimen (FIG. 7(c)) is very rough with grossly deformed and thick features. Wave-like terraces with strips aligning perpendicular to the impact fracture direction are evident in the inset possibly due to matrix shear yielding. To gain a better idea of the microstructures under the fracture surface, the specimen was cut and viewed using SEM. Characteristic multiple-crazing structures were observed 2 mm under the fracture surface, as seen in FIG. 7(d), which accounts for the stress-whitened zone found under the fracture surface and seen in the specimen image in FIG. 6(b). Hence, shear yielding and multiple-crazing are both operative in the iPP/PEP-PEE$_E$-240 blend during impact testing.

A number of embodiments of the invention have been described. Nevertheless, it will be understood that various modifications may be made without departing from the spirit and scope of the invention. Accordingly, other embodiments are within the scope of the following claims.

What is claimed is:

1. A blend comprising (a) a continuous phase comprising isotactic polypropylene and (b) a dispersed phase comprising a poly-(ethylene-alt-propylene)-b-poly(ethylene-ran-ethylethylene) diblock copolymer, wherein the amount of diblock copolymer is less than 20 wt % based on the total weight of the blend.

2. The blend of claim 1 wherein the amount of diblock copolymer is no greater than 10 wt % based on the total weight of the blend.

3. The blend of claim 1 wherein the amount of diblock copolymer is no greater than 5 wt % based on the total weight of the blend.

4. The blend of claim 1 wherein the amount of diblock copolymer is no greater than 2.5 wt % based on the total weight of the blend.

5. The blend of claim 1 wherein the amount of diblock copolymer is between 1 and 5 wt % based on the total weight of the blend.

6. The blend of claim 1 wherein the diblock copolymer is in the form of micelles having an average diameter no greater than 150 nm.

7. The blend of claim 1 wherein the diblock copolymer is in the form of micelles having an average diameter no greater than 100 nm.

8. The blend of claim 1 wherein the blend has an Izod impact strength that is at least 5 times greater than the Izod impact strength of an identical blend that lacks the block copolymer.

9. The blend of claim 1 wherein the blend has an Izod impact strength that is at least 10 times greater than the Izod impact strength of an identical blend that lacks the block copolymer.

10. The blend of claim 1, wherein the blend has a tensile strain at break that is at least 20 times greater than the tensile strain at break of an identical blend that lacks the block copolymer.

11. A blend comprising (a) a continuous phase comprising isotactic polypropylene and (b) a dispersed phase comprising a poly-(ethylene-alt-propylene)-b-poly(ethylene-ran-ethyl ethylene) diblock copolymer in the form of micelles having an average diameter no greater than 150 nm, wherein (i) the amount of diblock copolymer is less than 10 wt % based on the total weight of the blend, (ii) the blend has an Izod impact strength that is at least 5 times greater than the Izod impact strength of an identical blend that lacks the block copolymer, and (iii) the blend has a tensile strain at break that is at least 20 times greater than the tensile strain at break of an identical blend that lacks the block copolymer.

* * * * *